(12) United States Patent
Watanabe et al.

(10) Patent No.: US 6,775,227 B2
(45) Date of Patent: Aug. 10, 2004

(54) OPTICAL DISK AUTHENTICITY CHECKING BASED ON PRECISION OF A PHYSICAL FEATURE

(75) Inventors: Atsushi Watanabe, Kyoto (JP); Satsoshi Nishiumi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/986,646

(22) Filed: Nov. 9, 2001

(65) Prior Publication Data

US 2003/0048718 A1 Mar. 13, 2003

(30) Foreign Application Priority Data

Sep. 7, 2001 (JP) ........................................ 2001-271915

(51) Int. Cl.[7] ........................... G11B 20/00; G11B 7/013
(52) U.S. Cl. ............................. 369/275.3; 369/53.21; 369/59.25
(58) Field of Search ......................... 369/275.3, 53.21, 369/47.2, 47.21, 59.25, 30.04

(56) References Cited

U.S. PATENT DOCUMENTS

| | | | |
|---|---|---|---|
| 4,734,796 A | | 3/1988 | Grynberg et al. |
| 5,696,757 A | | 12/1997 | Ozaki et al. |
| 5,737,286 A | | 4/1998 | Timmermans et al. |
| 5,761,301 A | * | 6/1998 | Oshima et al. ............... 705/57 |
| 5,818,812 A | | 10/1998 | Moribe et al. |
| 5,875,156 A | | 2/1999 | Ito et al. |
| 5,982,886 A | * | 11/1999 | Itami et al. ................... 705/57 |
| 6,115,533 A | * | 9/2000 | Tahara et al. ................ 386/94 |
| 6,226,770 B1 | * | 5/2001 | Barchan ..................... 714/756 |
| 6,282,608 B1 | * | 8/2001 | Dziekan et al. ............. 711/112 |
| 6,389,542 B1 | * | 5/2002 | Flyntz ........................ 713/201 |
| 6,453,369 B1 | * | 9/2002 | Imamura et al. ............. 710/36 |
| 6,477,124 B2 | * | 11/2002 | Carson ..................... 369/53.21 |
| 6,477,134 B1 | * | 11/2002 | Stebbings et al. .......... 369/272 |
| 6,526,010 B1 | * | 2/2003 | Morioka et al. ......... 369/47.15 |
| 6,584,046 B2 | * | 6/2003 | Oshima et al. .......... 369/13.31 |

FOREIGN PATENT DOCUMENTS

| | | | |
|---|---|---|---|
| EP | 0 637 016 A | 2/1995 | |
| EP | 637023 A1 * | 2/1995 | ........... G11B/20/00 |
| EP | 0 689 200 A | 12/1995 | |
| EP | 0 854 475 B1 | 7/1998 | |
| EP | 0 899 733 B1 | 3/1999 | |
| EP | 0 989 553 A | 3/2000 | |
| EP | 1 003 162 A | 5/2000 | |
| EP | 1 098 303 A | 5/2001 | |
| JP | 7-282472 | 10/1995 | |
| JP | 9-81938 | 3/1997 | |
| JP | 10-233019 | 9/1998 | |
| JP | 11 003568 A | 1/1999 | |
| WO | WO 01/78074 A1 | 10/2001 | |

OTHER PUBLICATIONS

Brochure, "SecuROM protecting your investments,".

* cited by examiner

*Primary Examiner*—Gautam R. Patel
(74) *Attorney, Agent, or Firm*—Nixon & Vanderhye P.C.

(57) ABSTRACT

An optical disk includes a feature forming area 11 and a criterion recording area 12. The feature forming area 11 is an area provided with physical features used for determining whether it is an authorized optical disk or not. The criterion recording area 12 is an area having recorded therein the data of a determination criterion, i.e., a criterion by which it is determined whether the optical disk has been produced in an authorized manner or not on the basis of the physical feature. An optical disk reproduction apparatus detects the physical features provided in the feature forming area 11, and reads the determination criterion recorded in the criterion recording area 12. Furthermore, based on the determination criterion which has been read, the optical disk reproduction apparatus determines whether or not the detected physical features are those provided for an authorized optical disk. Thus, the optical disk reproduction apparatus can determine whether or not the optical disk has been copied in an unauthorized manner.

16 Claims, 6 Drawing Sheets

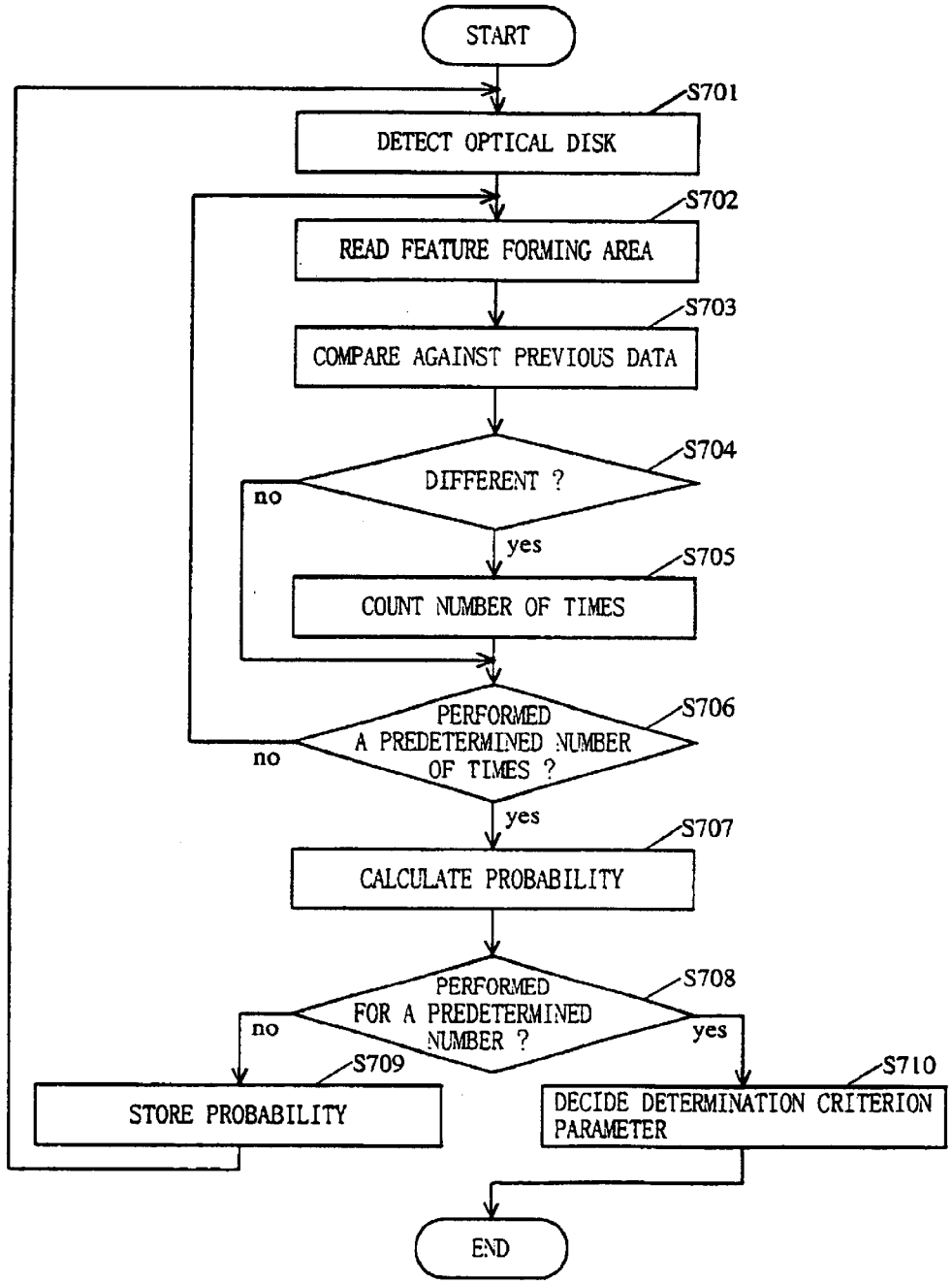

OPTICAL DISK AUTHENTICITY CHECKING BASED ON PRECISION OF A PHYSICAL FEATURE

BACKGROUND OF THE INVENTION

1. Field of the Invention

The present invention relates to an optical disk, and more particularly to an optical disk which enables determination as to whether or not it is an optical disk which has been copied in an unauthorized manner.

2. Description of the Background Art

Conventionally, as a method for preventing unauthorized copying of optical disks, a method is commonly used which previously performs a specific process to an optical disk. Specifically, this method utilizes physical features which are formed on an optical disk through the specific process to determine whether it is an authorized optical disk or not. When an optical disk is copied in an unauthorized manner, only the usual data which is recorded on the optical disk will be copied, without performing the aforementioned specific process. Therefore, an optical disk which has been copied in an unauthorized manner lacks the physical features formed by the specific process. When accessing an optical disk, an optical disk drive checks for physical features to determine whether or not the specific process has been properly performed, thereby determining whether it is an optical disk produced in an authorized manner or an optical disk copied in an unauthorized manner. According to the above method, optical disks copied in an unauthorized manner can be prevented from being used.

For example, according to an invention described in Japanese Patent Laid-Open Publication No. 7-282472, a signal pit array is provided between specific tracks, such that the tracks located on the inner and outer periphery sides of the pit array define pitless areas free of pits. In accordance with an optical disk having such features, it is possible to determine whether or not it is an optical disk produced in an authorized manner, based on the presence or absence of randomly-read portions on the optical disk.

According to an invention described in Japanese Patent Laid-Open Publication No. 9-81938, displaced pits are formed in specific positions. In accordance with an optical disk having such features, it is possible to determine whether or not it is an optical disk produced in an authorized manner based on the presence or absence of displaced pits.

In addition to those described in the above two publications, various methods are conceivable as methods for determining authorized disks, e.g., a method utilizing the number, positions, or size of physical features obtained by performing a specific process for an optical disk, or a method utilizing the reflectance when physical features are irradiated with laser light. The determination as to whether an optical disk has been produced in an authorized manner or not is made based on whether the physical features satisfy a certain determination criterion. For example, in the case where determination is made by utilizing the number of displaced pits, the presence of a certain number or more of displaced pits would constitute a criterion for determining an authorized optical disk. In the case where determination is made by utilizing reflectance, the presence of a certain range of reflectance would constitute a criterion for determining an authorized optical disk.

The determination criterion for an authorized optical disk is decided so that any optical disk on which physical features are formed with a predetermined precision or above will be determined as an authorized optical disk. This is in order to ensure that an optical disk having no physical features formed thereon will be determined as optical disk copied in an unauthorized manner, and that an optical disk having physical features formed with a low precision will also be determined as an optical disk copied in an unauthorized manner. The reason is that an optical disk having physical features formed with a low precision can be easily produced, and therefore could also be produced in an unauthorized manner by imitating its physical features.

Moreover, a security level is decided depending on what degree of precision of the formed physical features will be permitted under the determination criterion. Specifically, the security level is lowered by setting a lenient determination criterion, i.e., by permitting optical disks having physical features formed with a low precision. On the other hand, the security level is increased by setting a severe determination criterion, i.e., by only permitting optical disks having physical features formed with a high precision.

Conventionally, the determination criterion for determining an optical disk produced in an authorized manner is previously set in a reproduction apparatus for optical disks. In other words, in order to change the determination criterion, the setting of the reproduction apparatus for optical disks must be changed. However, it is practically impossible to change the setting of the reproduction apparatus for optical disks owned by every user. Therefore, conventionally, the determination criterion for determining an optical disk produced in an authorized manner is fixed and cannot be changed.

In the actual production of optical disks, it may become necessary to change the security level. For example, consider the case where the security level is to be lowered. By lowering the security level, even optical disks having physical features formed with a low precision will be permitted as optical disks produced in an authorized manner. Setting a low security level results in an increased yield and improved productivity. Therefore, the security level may be set low in the case where productivity is regarded as important, e.g., when it is intended to reduce the production cost or produce large quantities over a short period of time. On the other hand, depending on the value of the contents, a high security level may be set in order to prevent unauthorized copying as much as possible. Furthermore, in the case where a currently-set security level can no longer prevent unauthorized copying, it will be necessary to increase the security level in order to cope with the unauthorized copying. Thus, it would be desirable to employ a changeable security level so as to allow a security level to be set in accordance with the purpose.

Conventionally, however, it is impossible to change the security level because the determination criterion cannot be changed. Therefore, once a security level is set, it cannot be changed later, so that it is impossible to set a security level depending on the purpose.

SUMMARY OF THE INVENTION

Therefore, an object of the present invention is to provide an optical disk which allows the security level against unauthorized copying to be easily changed.

The present invention has the following features to attain the object above.

A first aspect of the present invention is directed to an optical disk subject to determination by an optical disk reproduction apparatus as to whether it is an optical disk produced in an authorized manner or not, the optical disk comprising a feature forming area and a criterion recording area. The feature forming area has formed therein a physical feature to be used by the optical disk reproduction apparatus for determining whether it has been produced in an authorized manner or not. The criterion recording area has recorded therein a determination criterion by which it is determined as having been produced in an authorized manner if the physical feature is formed with a predetermined precision or above.

In accordance with the above configuration, a determination criterion is recorded on an optical disk for determining whether it has been produced in an authorized manner or not. The determination criterion can be changed by changing the information which is recorded on the optical disk. This can be easily done because there is no need to change the setting of the optical disk reproduction apparatus. Therefore, the security level against unauthorized copying can be easily changed by changing the determination criterion. As a result, the security level may be lowered for improved optical disk productivity, e.g., in the case where the optical disk productivity is regarded as important. The security level may be increased, e.g., in the case where prevention of unauthorized copying is regarded as important. Thus, the security level can be easily changed depending on the purpose.

The criterion recording area may be contained in an area where data is subsequently writable. In this case, the determination criterion recorded in the criterion recording area is decided based on the physical feature formed in the feature forming area.

In accordance with the above configuration, the determination criterion is decided based on the physical features formed on the very optical disk on which the determination criterion is recorded. Therefore, it is possible to decide a determination criterion for each single optical disk produced. As a result, a determination criterion which is appropriate for each optical disk can be recorded.

Moreover, a plurality of kinds of physical features may be formed in the feature forming area. In this case, the determination criterion is recorded in the criterion recording area with respect to each of the plurality of kinds of physical features.

In accordance with the above configuration, it is possible to make a determination by using a plurality of determination methods, so that not only the determination criterion but also the determination method can be changed. Therefore, if security is broken with respect to some of the plurality of determination methods, it is possible to switch to other methods. For example, consider the case where determination methods A and B are used. If the security provided by determination method A is broken through unauthorized copying, the determination method can be switched to determination method B to prevent unauthorized copying. Thus, in accordance with the above structure, when security is broken, the determination method can be switched to another method, so that a higher level of security can be provided than by changing the determination criterion.

A second aspect of the present invention is directed to an optical disk reproduction apparatus for reproducing data recorded on an optical disk, the optical disk reproduction apparatus comprising: a feature detection section (corresponding to step S403 in the embodiment), a criterion reading section (corresponding to step S401 in the embodiment), and a determination section (corresponding to step S407 in the embodiment). The feature detection section detects from an optical disk a physical feature used for determining whether it has been produced in an authorized manner or not. The criterion reading section reads from the optical disk a determination criterion by which it is determined as having been produced in an authorized manner if the physical feature is formed with a predetermined precision or above. The determination section determines whether the optical disk has been produced in an authorized manner or not, depending on whether the physical feature detected by the determining the feature detection section satisfies the determination criterion read by the criterion reading section or not.

In accordance with the above configuration, the determination criterion is recorded on the very optical disk which is subjected to determination, and is not set in the optical disk reproduction apparatus. Since a determination criterion is set for each optical disk, the optical disk reproduction apparatus can change the determination criterion for each optical disk. Therefore, the optical disk reproduction apparatus can easily change the security level against unauthorized copying by changing the determination criterion. As a result, the security level may be lowered for optical disks which are produced with priority attached to optical disk productivity, for example, whereas the security level may be increased for optical disk which are produced with priority attached to the prevention of unauthorized copying, for example. Thus, the security level can be easily changed depending on the optical disk.

Moreover, the optical disk reproduction apparatus may further comprise a reproduction section (corresponding to S409 in the embodiment). The reproduction section reproduces contents data recorded on an optical disk only if the optical disk is determined by the determination section to have been produced in an authorized manner.

In accordance with the above configuration, contents data are reproduced only the optical disk is confirmed to have been produced in an authorized manner. As a result, it is possible to prohibit the use of optical disks which are produced through unauthorized copying.

Moreover, the determination section may determine, even before all the physical features that are necessary for determination are detected by the feature detection section, an optical disk to have been produced in an authorized manner if the determination criterion is satisfied. In this case, if an optical disk is determined by the determination section to have been produced in an authorized manner, the reproduction section begins reproduction of the contents data even before all the physical features that are necessary for determination are detected by the feature detection section.

In accordance with the above configuration, the determination is completed, and the reproduction of the contents data is begun, as soon as the optical disk is determined to have been produced in an authorized manner, i.e., as soon as the determination criterion is satisfied. For example, in the case of a determination method which requires an area having physical features formed therein to be detected 10 times, the reproduction of the contents data is begun if the determination criterion is satisfied upon the seventh detection. Thus, the wait time required for determination before the execution of the contents can be reduced, thereby reducing the awkwardness felt by the user.

A third aspect of the present invention is directed to an optical disk recording apparatus for recording data on an optical disk, the optical disk recording apparatus comprising: a feature formation section, a determination criterion storing section (corresponding to a storage section 51 in the embodiment), and a criterion recording section (corresponding to a data recording section 52 in the embodiment). The feature formation section forms on the optical disk a physical feature to be used for determining whether it has been produced in an authorized manner or not. The determination criterion storing section previously stores a determination criterion by which it is determined as having been produced in an authorized manner if the physical feature is formed with a predetermined precision or above. The criterion recording section records the determination criterion stored in the determination criterion storing section on the optical disk.

In accordance with the above configuration, it is possible to produce an optical disk having recorded thereon a determination criterion as to whether the optical disk has been produced in an authorized manner or not. Since the determination criterion is recorded on the optical disk produced in this manner, it is possible to easily change the determination criterion for each optical disk. Therefore, through changing the determination criterion, it is possible to produce optical disks which allow the security level against unauthorized copying to be easily changed. As a result, the security level may be lowered in the case where optical disk productivity is regarded as important, and the security level may be increased in the case where prevention of unauthorized copying is regarded as important, for example. Thus, an optical disk which allows the security level to be easily changed depending on the purpose can be produced.

Moreover, the determination criterion stored in the determination criterion storing section may be decided based on the physical feature on the optical disk formed by the feature formation section. In this case, the criterion recording section records the determination criterion stored in the determination criterion storing section in a subsequently-writable area of the optical disk.

In accordance with the above configuration, the determination criterion recorded on the optical disk is decided based on the physical features formed on the very optical disk on which the determination criterion is recorded. Therefore, an optical disk recording apparatus sets a determination criterion for each optical disk. As a result, the optical disk recording apparatus can record a determination criterion which is appropriate for each optical disk.

The determination criterion stored in the determination criterion storing section may be decided based on the physical feature formed on a prefabricated optical disk specialized for inspection purposes.

In accordance with the above configuration, a determination criterion is decided by using a prefabricated optical disk specialized for inspection purposes. Therefore, a determination criterion will be decided based on the precision with which the physical features are actually formed. If a determination criterion is set independently of the precision with which the physical features are actually formed, it may be possible for the proportion of the produced optical disks which satisfy the determination criterion to significantly decrease due to a high determination criterion being set too high. In contrast, in accordance with the above configuration, a determination criterion can be decided in accordance with the performance of the production equipment. Therefore, any significant deterioration in the optical disk productivity due to an excessively high determination criterion can be prevented.

A fourth aspect of the present invention is directed to an authorized disk determination method for determining whether an optical disk to be reproduced has been produced in an authorized manner or not, the authorized disk determination method comprising a feature detection step (corresponding to step S403 in the embodiment), a criterion reading step (corresponding to step S401 in the embodiment), and a determination step (corresponding to step S407 in the embodiment). The optical disk has recorded thereon a physical feature used for determining whether it is an optical disk produced in an authorized manner or not, and a determination criterion by which it is determined as having been produced in an authorized manner if the physical feature is formed with a predetermined precision or above. The feature detection step detects the physical feature from the optical disk. The criterion reading step reads the determination criterion from the optical disk. The determination step determines whether the optical disk has been produced in an authorized manner or not based on whether the physical feature detected by the feature detection step satisfies the determination criterion read by the criterion reading step or not.

In accordance with the above configuration, the determination criterion is recorded on the very optical disk which is subjected to determination, and is not set in the optical disk reproduction apparatus. Since a determination criterion is set for each optical disk, the determination criterion can be changed for each optical disk in the determination of an authorized disk. Therefore, the security level against unauthorized copying can be easily changed by changing the determination criterion. As a result, the security level may be lowered for optical disks which are produced with priority attached to optical disk productivity, for example, whereas the security level may be increased for optical disk which are produced with priority attached to the prevention of unauthorized copying, for example. Thus, the security level can be easily changed depending on the optical disk.

A fifth aspect of the present invention is directed to a method for producing an optical disk such that the optical disk to be reproduced is capable of being determined as having been produced in an authorized manner or not by an optical disk reproduction apparatus, comprising: a feature formation step(corresponding to a feature formation section 53 in the embodiment), a criterion deciding step (corresponding to a storage section 51 in the embodiment), and a criterion recording step (corresponding to a data recording section 52 in the embodiment). The feature formation step forms on the optical disk a physical feature to be used for determining whether it has been produced in an authorized manner or not. The criterion deciding step decides, based on the physical feature, a determination criterion by which it is determined as having been produced in an authorized manner if the physical feature is formed with a predetermined precision or above. The criterion recording step records on the optical disk the determination criterion decided by the criterion deciding step.

In accordance with the above configuration, it is possible to produce an optical disk having recorded thereon a determination criterion as to whether the optical disk has been produced in an authorized manner or not. Since the determination criterion is recorded on the optical disk produced in this manner, it is possible to easily change the determination criterion for each optical disk. Therefore, through changing the determination criterion, it is possible to produce optical disks which allow the security level against unauthorized copying to be easily changed. As a result, the security level may be lowered in the case where optical disk productivity is regarded as important, and the security level may be increased in the case where prevention of unauthorized copying is regarded as important, for example. Thus, an optical disk which allows the security level to be easily changed depending on the purpose can be produced.

Moreover, the criterion deciding step may decide the determination criterion based on the physical feature formed by the feature formation step. In this case, the criterion recording step records the determination criterion decided by the criterion deciding step in a subsequently-writable area of the optical disk.

In accordance with the above configuration, the determination criterion recorded on the optical disk is decided based on the physical features formed on the very optical disk on which the determination criterion is recorded. Therefore, a determination criterion is set for each optical disk. As a result, a determination criterion which is appropriate for each optical disk can be recorded.

The criterion deciding step may decide the determination criterion based on the physical feature formed on a prefabricated optical disk specialized for inspection purposes.

In accordance with the above configuration, a determination criterion is decided by using a prefabricated optical disk specialized for inspection purposes. Therefore, a determination criterion will be decided based on the precision with which the physical features are actually formed. If a determination criterion is set independently of the precision with which the physical features are actually formed, it may be possible for the proportion of the produced optical disks which satisfy the determination criterion to significantly decrease due to a determination criterion which is set too high. In contrast, in accordance with the above configuration, a determination criterion can be decided in accordance with the performance of the production equipment. Therefore, significant deterioration in the optical disk productivity due to an excessively high determination criterion can be prevented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flowchart illustrating the flow of a decision process for a determination criterion parameter in a parameter determination section 505 shown in FIG. 6.

DESCRIPTION OF THE PREFERRED EMBODIMENTS

Figure 1:
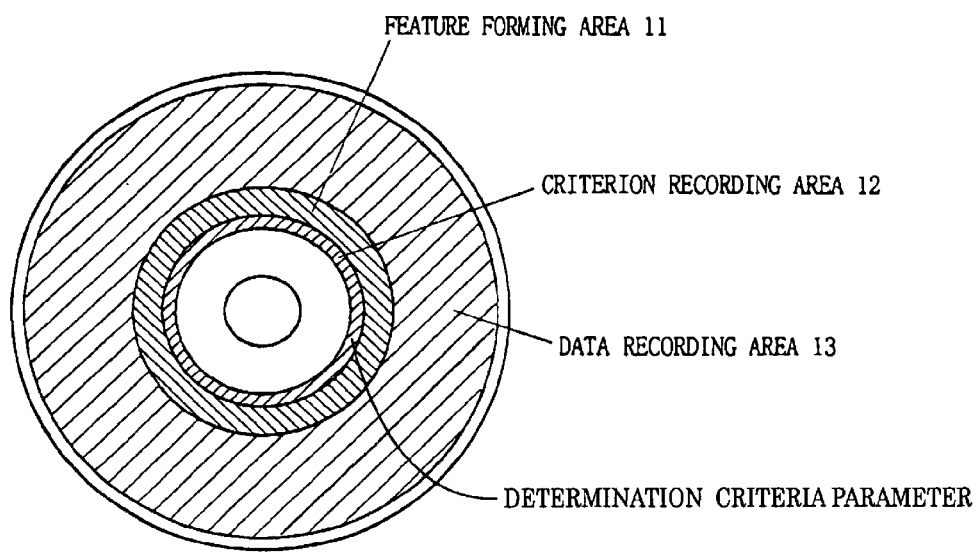
FIG. 1 is a diagram for explaining recording areas of an optical disk according to the present embodiment.

First, an optical disk according to the present embodiment will be described. FIG. 1 is a diagram for explaining recording areas of an optical disk according to the present embodiment. In FIG. 1, the optical disk according to the present embodiment includes a feature forming area 11, a criterion recording area 12, and a data recording area 13. It is desirable that the feature forming area 11 and the criterion recording area 12 be provided on the inner periphery-side (where reading is begun) of the data recording area 13 because they are always to be read during a reproduction operation. Data for managing the optical disk and contents data are typically recorded in the data recording area 13. Hereinafter, the details of the feature forming area 11 and the criterion recording area 12 will be described.

The feature forming area 11 is an area in which physical features of the optical disk are formed. The physical features of the optical disk, which are employed for the determination of optical disks produced in an authorized manner from optical disks copied in an unauthorized manner, are features that only the authorized optical disks have. According to the present embodiment, the physical features are pit arrays formed between recording tracks and pitless areas on the inner and outer periphery sides thereof. Therefore, according to the present embodiment, the determination of unauthorized copying is made by utilizing the pit arrays formed between recording tracks and the pitless areas on the inner and outer periphery sides thereof. In other embodiments, the determination of unauthorized copying may be made by utilizing other physical features.

Figure 2:
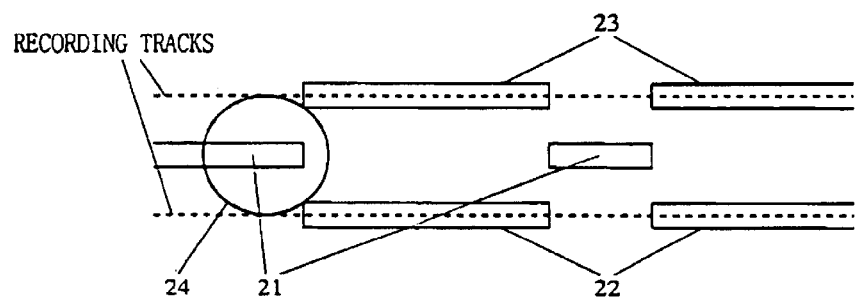
FIG. 2 is a diagram illustrating an example of a feature forming area 11 shown in FIG. 1.

FIG. 2 is a diagram illustrating an example of a feature forming area 11 shown in FIG. 1. As shown in FIG. 2, inter-track pit arrays 21, inner periphery-side pit arrays 22 and outer periphery-side pit arrays 23 are formed in the feature forming area 11. The inter-track pit arrays 21 are formed between recording tracks. The inner periphery-side pit arrays 22 and the outer periphery-side pit arrays 23 are formed on recording tracks. No pit arrays are formed on the inner or outer periphery side of the inter-track pit array 21. The structure shown in FIG. 2 is a structure in which the inter-track pit arrays 21 formed between two rows of recording tracks. The feature forming area 11 may alternatively have a structure such that pit arrays are formed respectively between three or more rows of recording tracks.

In the feature forming area 11 constructed in the above manner, when an inter-track pit array 21 is to be read, the center of a light spot 24 comes upon the inter-track pit array 21 as shown in FIG. 2. In other words, the center of the light spot 24 is at a center between the inner periphery-side pit arrays 22 and the outer periphery-side pit arrays 23. Therefore, after the inter-track pit array 21 is read, the light spot 24 will move onto either recording track, i.e., an inner periphery-side pit array 22 or an outer periphery-side pit array 23. The movement of the light spot 24 occurs randomly depending on the control state of the position of the light spot. Accordingly, the data of either the inner periphery-side pit array 22 or the outer periphery-side pit array 23 will be randomly read. Different data are recorded in the inner periphery-side pit array 22 and the outer periphery-side pit array 23. As a result, when the feature forming area 11 is read a plurality of times, the data will be randomly read.

If the optical disk lacks the inter-track pit arrays 21, the same data will be read each time, or the probability of different data being read is decreased, despite a plurality of times of reading. Even if the inter-track pit arrays 21 are formed, the same data will be read if they are not formed with a high precision, e.g., if they are not formed in the center between recording tracks. Specifically, if the inter-track pit arrays 21 are formed so as to be shifted closer to the inner periphery-side recording track, the outer periphery-side pit arrays 23 will hardly be read even after reading is performed a plurality of times, so that only the inner periphery-side pit arrays 22 will be read. Moreover, if the leading ends of the inner periphery-side pit arrays 22 and the outer periphery-side pit arrays 23 are not aligned, for example, the same data will be read each time. Specifically, if the inner periphery-side pit arrays 22 are read before the outer periphery-side pit arrays 23, the outer periphery-side pit arrays 23 will hardly be read even after reading is performed a plurality of times, so that only the inner periphery-side pit arrays 22 will be read.

Moreover, a plurality of sets of inter-track pit arrays 21, inner periphery-side pit arrays 22, and outer periphery-side pit arrays 23 are formed in the feature forming area 11. As a result, when the entire feature forming area 11 is read a plurality of times, there is an increased probability of different data being read each time. Even in the case where the same data are read each time with respect to some of the sets formed in the feature forming area 11 due to a low formation precision, the data resulting after reading the entire feature forming area 11 will not be the same each time. However, if there are many sets which are formed with a low precision among the sets formed in the feature forming area 11, the probability of different data being read each time when reading the feature forming area 11 will be reduced.

The feature forming area 11 formed in the above manner is read a plurality of times by an optical disk reproduction apparatus. If the aforementioned physical features are formed, different data will be read each time as the feature forming area 11 is read a plurality of times. On the other hand, if the aforementioned physical features are not formed, the same data will be read each time. Even if the aforementioned physical features are formed, if their precision is low, the probability of different data being read each time will be reduced. Thus, it can be determined whether or not the optical disk has been produced in an authorized manner, by reading the feature forming area 11 a plurality of times and calculating the probability of different data being read each time. Specifically, if the probability of previously-read data being different from currently-read data as a result of reading the feature forming area 11 a plurality of times is equal to or greater than a predetermined probability, then authorized production is determined. The predetermined probability is recorded in the criterion recording area 12 as a determination criterion parameter. Hereinafter, the details of the criterion recording area 12 will be described.

The criterion recording area 12 shown in FIG. 1 is an area in which a determination criterion is recorded. The determination criterion is used by an optical disk reproduction apparatus for determining authorized production. According to the present embodiment, a determination criterion parameter is recorded on the optical disk as a determination criterion. A determination criterion parameter is a numerical value serving as a criterion for determining whether an optical disk has been produced in an authorized manner based on physical features. The determination criterion is set so that authorized production will be determined when physical features are formed with a predetermined precision or above. Herein, it is assumed that the determination criterion as to whether or not an optical disk has been produced in an authorized manner is a 80% or more probability that previously-read data and currently-read data are different as a result of reading the feature forming area 11 a plurality of times. Accordingly, the determination criterion parameter recorded in the criterion recording area 12 is 80%.

In other embodiments, the determination method for unauthorized copying is not limited to that which mentioned above, but may be any method which makes determination by using physical features which only authorized optical disks have. For example, a method utilizing the number, positions, or size of displaced pits as physical features, or a method utilizing the reflectance when the physical features are irradiated with laser light may be used.

The determination criterion may be any criterion which allows for varying security levels. In other words, the determination criterion may be such that the determination as to whether or not an optical disk has been produced in an authorized manner is made based on the precision with which physical features are formed. In the case where the number of displaced pits is used as the determination criterion, for example, the number or a proportion thereof to be properly formed is used. In this case, for example, a lower limit value for the number of displaced pits that is requisite for determining authorized production may be used as a determination criterion parameter. In the case where the positions or size of displaced pits (including length, thickness, area, or volume) is used, allowable errors or a proportion concerning the positions or size thereof may be used for the determination criterion. In this case, for example, an upper limit value and a lower limit value for the length of displaced pits that are requisite for determining authorized production are used as determination criterion parameters. Furthermore, in the case where the reflectance when physical features are irradiated with laser light is used, allowable errors or a proportion concerning the reflectance of the physical features may be used for the determination criterion. In this case, for example, an upper limit value and a lower limit value for the range of reflectance that are requisite for determining authorized production are used as determination criterion parameters.

According to the present embodiment, a determination criterion parameter is recorded as a determination criterion on the optical disk. The content to be recorded on the optical disk is not limited to a determination criterion parameter, but a determination method may itself be recorded. For example, in the case where the above-described determination method is used, where it is necessary to read the feature forming area 11 a predetermined number of times, the predetermined number may be recorded on the optical disk. As a result, the number of times of reading can be changed for each optical disk, whereby it becomes possible to alter the time required for determination.

Furthermore, while the determination of unauthorized copying is made by using one kind of determination method according to the present embodiment, a plurality of kinds of determination methods for unauthorized copying may be used in other embodiments. In this case, in the criterion recording area 12 of the optical disk, a determination criterion parameter is recorded for each of the plurality of determination methods. The plurality of determination methods may be arranged so that they are simultaneously employed, or so that when one of the methods succumbs to unauthorized copying, another method is used instead.

Figure 3:
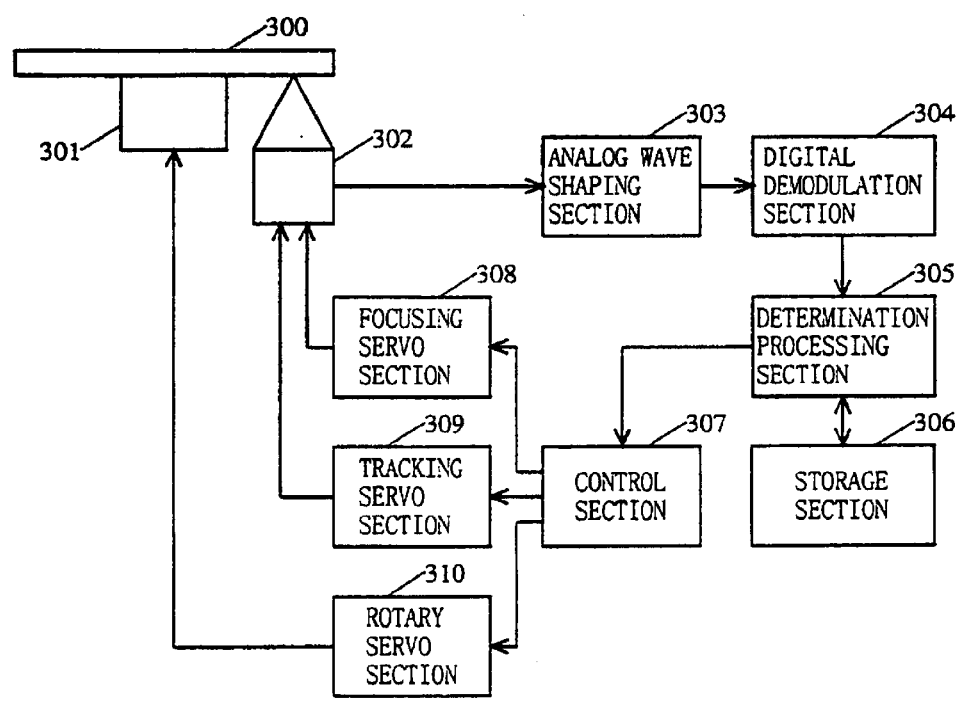
FIG. 3 is a block diagram illustrating the structure of a reproduction apparatus for optical disks according to the present embodiment.

Next, a reproduction apparatus for optical disks according to the present embodiment will be described. Each time an optical disk is used, the reproduction apparatus determines whether or not the optical disk which is set in the reproduction apparatus has been produced in an authorized manner. FIG. 3 is a block diagram illustrating the structure of a reproduction apparatus for optical disks according to the present embodiment. In FIG. 3, the optical disk reproduction apparatus comprises a spindle motor 301, an optical pickup 302, an analog wave shaping section 303, a digital demodulation section 304, a determination processing section 305, a storage section 306, a control section 307, a focusing servo section 308, a tracking servo section 309, and a rotary servo section 310. Hereinafter, the operation of the optical disk reproduction apparatus according to the present embodiment will be described.

Figure 4:
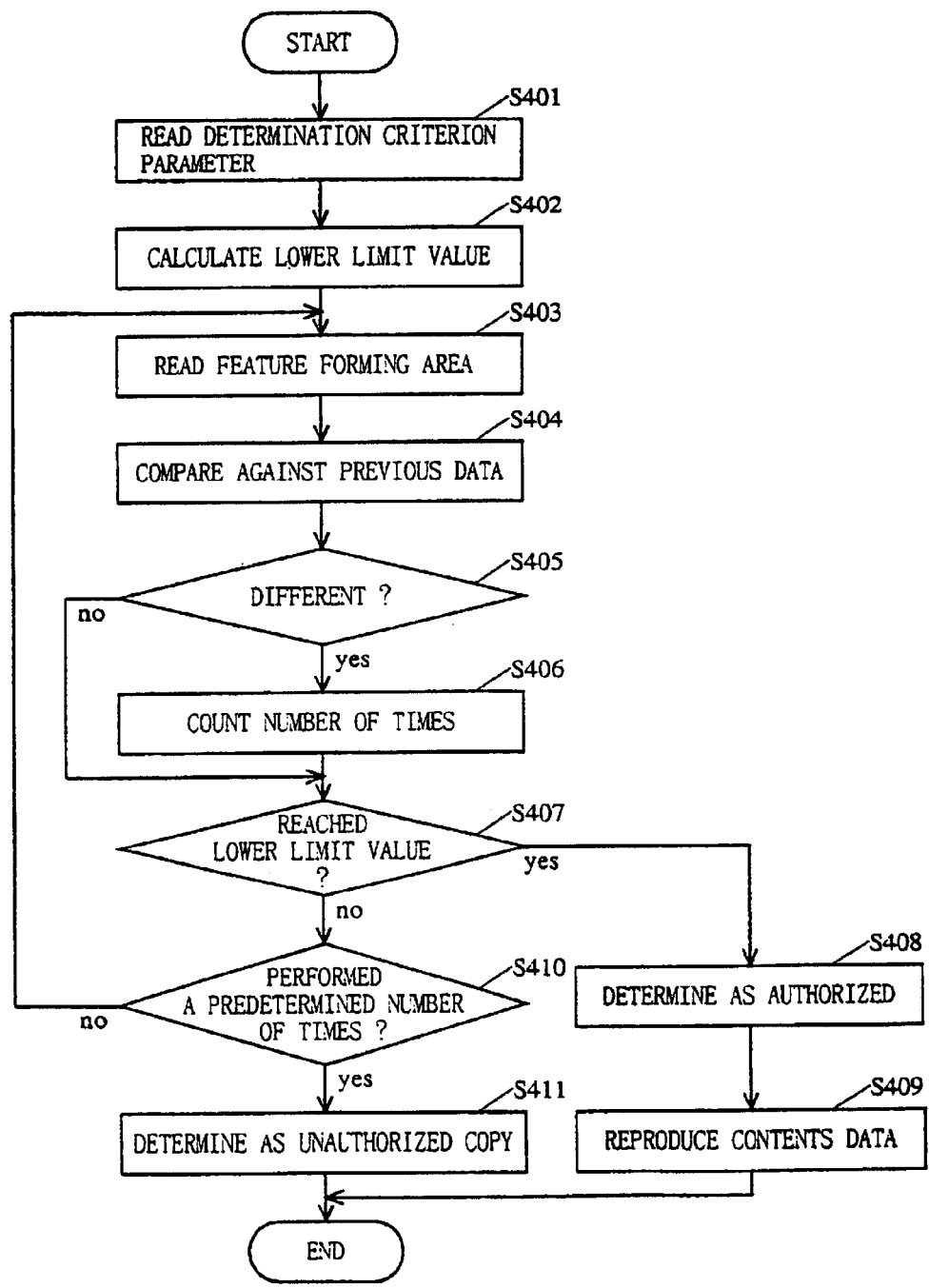
FIG. 4 is a flowchart showing a determination process in a determination processing section 305 shown in FIG. 3.

An optical disk 300, from which data is to be reproduced, is driven to rotate by the spindle motor 301. The optical pickup 302 converges semiconductor laser on a signal surface of the optical disk 300. The converged light having been reflected from the signal surface is converted into an electrical signal by means of a photodiode, for example, whereby an RF signal is generated. The generated RF signal is subjected to waveform shaping by the analog wave shaping section 303. The RF signal which has been subjected to the waveform shaping is demodulated into a digital signal by the digital demodulation section 304. The determination processing section 305 receives the demodulated digital signal, and performs a determination process as to whether the optical disk has been produced in an authorized manner or not. A detailed description of the determination process is shown in FIG. 4. In the case of reading the feature forming area 11 of the optical disk, the determination processing section 305 causes the storage section 306 to store the data which has been read, and data which is necessary for making a determination is also stored in the storage section 306. If the optical disk 300 is determined to have been produced in an authorized manner as a result of the determination process, the determination processing section 305 causes a reproduction section (not shown) to reproduce the data which is recorded on the optical disk 300. In accordance with an instruction from the determination processing section 305, the control section 307 moves the optical pickup 302 by means of the tracking servo section 309 to a portion where a start signal is recorded. Through the above operation, the determination processing section 305 can detect the physical features formed in the feature forming area 11, and read the determination criterion parameter recorded in the criterion recording area 12.

FIG. 4 is a flowchart showing a determination process in the determination processing section 305 shown in FIG. 3. The determination process shown in FIG. 4 is begun as the optical disk 300 is set in the reproduction apparatus according to the present embodiment. The optical disk 300 shown in FIG. 3 includes the feature forming area 11, the criterion recording area 12, and the data recording area 13 as shown in FIG. 1. First, the determination processing section 305 reads a determination criterion parameter recorded in the criterion recording area 12 of the optical disk 300 (step S401). Next, the determination processing section 305 calculates a lower limit value from the determination criterion parameter which has been read (step S402). The lower limit value is a value obtained by multiplying the probability which is recorded as the determination criterion parameter by a number of times of reading. In other words, the lower limit value represents a lower limit for the optical disk 300 to be determined as authorized, with respect to the number of times by which the data which is previously read from the feature forming area 11 differs from the data which is then read from the feature forming area 11.

After step S402, the determination processing section 305 reads the data in the feature forming area 11 (step S403). Then, the determination processing section 305 compares the data which was read in the process of step S403 against the previously-read data which is stored in the storage section 306 (step S404). When data is read for the first time, i.e., when no previously-read data is stored in the storage section 306, the determination processing section 305 does not perform comparison.

After step S404, the determination processing section 305 determines whether the data which was read in the process of step S403 differs from the previously-read data which is stored in the storage section 306 (step S405). If the result of the determination indicates that the data which was read in the process of step S403 differs from the previously-read data which is stored in the storage section 306, the determination processing section 305 counts the number of times the data differed (step S406). The number counted by the process of step S406 is stored in the storage section 306. On the other hand, if the data which was read in the process of step S403 is identical to the previously-read data which is stored in the storage section 306, the determination processing section 305 proceeds to the process of step S407, without performing the process of step S406.

Next, the determination processing section 305 makes a determination as to whether the number counted in the process of step S406 has reached the lower limit value or not (step S407). If the result of the determination at step S407 indicates that the number counted in the process of step S406 has reached the lower limit value, then the determination processing section 305 determines that the optical disk 300 has been produced in an authorized manner (step S408). Furthermore, the determination processing section 305 reproduces the contents data recorded in the data recording area 13 (step S409), and the process is ended.

On the other hand, if the number counted in the process of step S406 has not reached the lower limit value, then the determination processing section 305 makes a determination as to whether the reading process for the feature forming area 11 has been performed a predetermined number of times (step S410). The predetermined number of times is previously determined in the reproduction apparatus. If the result of the determination at step S410 indicates that the reading process for the feature forming area 11 has not been performed the predetermined number of times, then the determination processing section 305 repeats the processes of step S403 to step S407. On the other hand, if the result of the determination indicates that the reading process for the feature forming area 11 has been performed the predetermined number of times, then the determination processing section 305 determines that the optical disk 300 has been copied in an unauthorized manner (step S411), and the reproduction is terminated and the process is completed. Through the above process, the reproduction apparatus according to the present embodiment can determine whether or not the optical disk 300 has been produced in an authorized manner.

Figure 5:
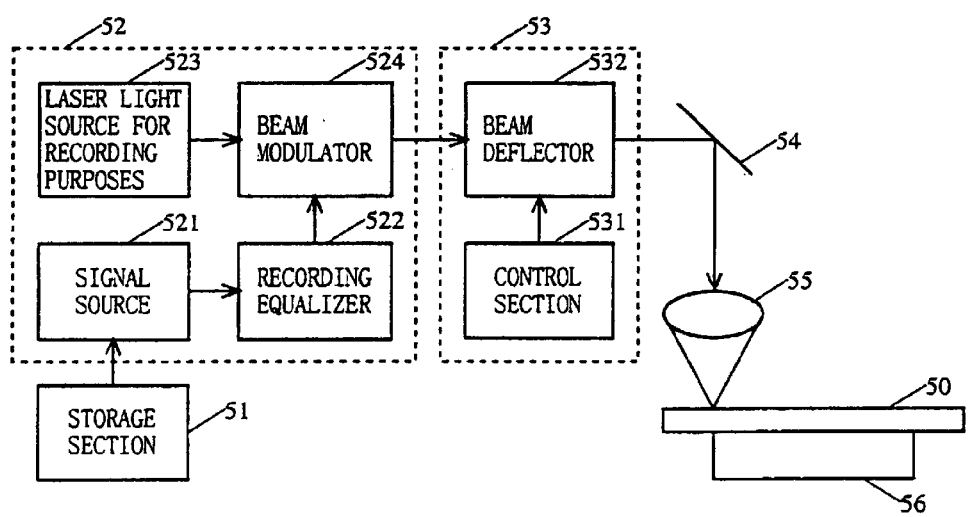
FIG. 5 is a diagram illustrating the structure of an optical disk recording apparatus employed in a production line of the optical disk according to the present embodiment.

Next, a method for producing the optical disk according to the present embodiment will be described. In spiral-shaped recording tracks, the optical disk recording apparatus according to the present embodiment forms pit arrays representing data indicating a determination criterion parameter, management data for the optical disk, and contents data. The optical disk recording apparatus forms the inter-track pit arrays 21, which are the physical features to be used for the determination of unauthorized copying, between the recording tracks in the feature forming area 11. FIG. 5 is a diagram illustrating the structure of the optical disk recording apparatus according to the present embodiment. The optical disk recording apparatus is employed in a production line for the optical disk. In FIG. 5, the optical disk recording apparatus comprises a storage section 51, a data recording section 52, a feature formation section 53, a mirror 54, a lens 55, and a spindle motor 56. Hereinafter, the operation of the optical disk recording apparatus according to the present embodiment will be described.

Figure 6:
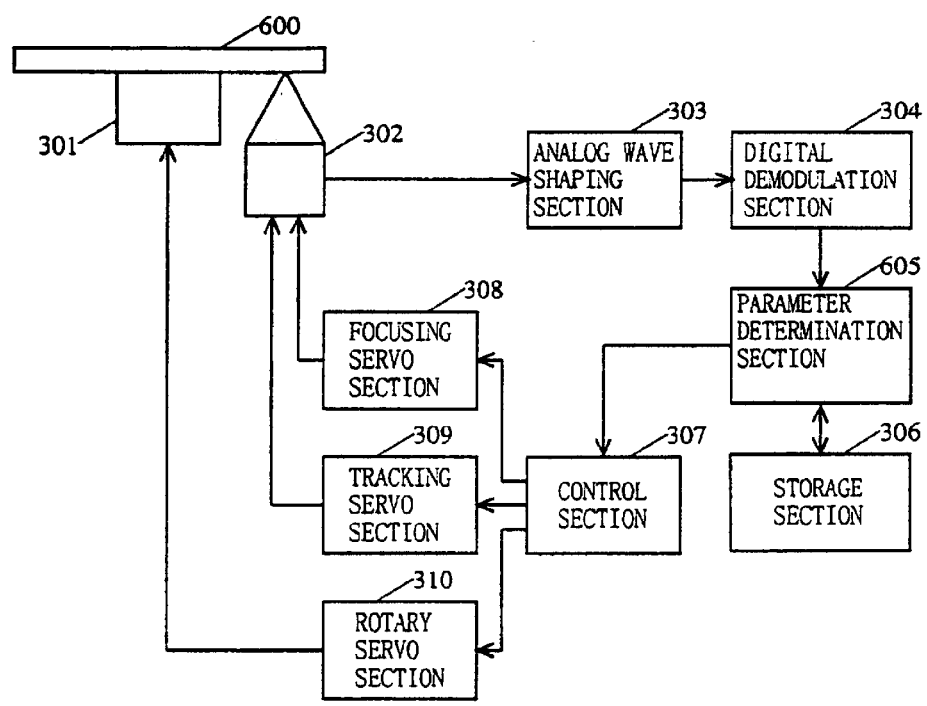
FIG. 6 is a diagram illustrating the structure of an optical disk reading apparatus specialized for deciding a determination criterion employed in a production line of the optical disk according to the present embodiment.

The storage section 51 previously stores a determination criterion parameter to be recorded on the optical disk. The determination criterion parameter is previously decided. A method of deciding the determination criterion parameter is shown in FIG. 6 and FIG. 7. The storage section 51 stores management data for the optical disk and contents data to be recorded on the optical disk.

The data recording section 52 records the data stored in the storage section 51 on a optical disk master 50. The data recording section 52 comprises a signal source 521, a recording equalizer 522, a laser light source for recording purposes 523, and a beam modulator 524. The signal source 521 generates a signal in accordance with the data recorded in the storage section 51. The signal generated from the signal source 521 is inputted to the beam modulator 524 with its pulse width modified by the recording equalizer 522. With the signal which is inputted from the recording equalizer 522, the beam modulator 524 subjects a laser beam outputted from the laser light source for recording purposes 523 to intensity modulation. The intensity-modulated laser beam is deflected by the mirror 54. The laser beam which has been deflected by the mirror 54 is converged onto the optical disk master 50 through the lens 55, so as to irradiate photoresist on the optical disk master 50. Since the optical disk master 50 having the photoresist applied thereto is driven to rotate by the spindle motor 56, the converged point of the laser beam is uniaxially moved. Through the above operation, the optical disk recording apparatus according to the present embodiment can record spiral-shaped pit array on the optical disk master 50. In other words, through the above operation, the optical disk recording apparatus according to the present embodiment can record data indicating a determination criterion parameter and contents data in the recording tracks of the optical disk master 50.

The feature formation section 53 forms the physical features to be used for the determination of unauthorized copying on the optical disk master 50. In other words, the feature formation section 53 is constructed so as to form the inter-track pit array 21. The pit arrays on the recording track in the feature forming area 11 are recorded by the data recording section 52. According to the present embodiment, the feature formation section 53 comprises a control section 531 and a beam deflector 532. The control section 531 sends a signal to the beam deflector 532 for changing the direction of the laser beam. In accordance with the signal from the control section 531, the beam deflector 532 deflects the laser beam which has been modulated by the beam modulator 524. Through the above operation, the optical disk recording apparatus according to the present embodiment can form the physical features to be used for the determination of unauthorized copying, i.e., displaced pit arrays between recording tracks.

Next, a method of deciding the determination criterion parameter will be described. The decision of the determination criterion parameter is made by using an optical disk specialized for checking purposes having the feature forming area 11 formed thereon. In other words, the determination criterion parameter is decided based on the physical features which are formed on the optical disk specialized for checking purposes. The physical features which are formed on the optical disk specialized for checking purposes are detected by an optical disk reading apparatus specialized for deciding the determination criterion parameter, which is employed in a production line for the optical disk. FIG. 6 is a diagram illustrating the structure of an optical disk reading apparatus specialized for deciding a determination criterion according to the present embodiment. The optical disk reading apparatus specialized for deciding the determination criterion parameter is employed in a production line for the optical disk. In FIG. 6, the optical disk reading apparatus specialized for deciding the determination criterion parameter comprises a spindle motor 301, an optical pickup 302, an analog wave shaping section 303, a digital demodulation section 304, a parameter determination section 605, a storage section 306, a control section 307, a focusing servo section 308, a tracking servo section 309, and a rotary servo section 310. An optical disk specialized for inspection purposes 600 is set in the optical disk reading apparatus. Note that the optical disk specialized for inspection purposes 600 shown in FIG. 6 includes the feature forming area 11 as shown in FIG. 1. As shown in FIG. 6, the optical disk reading apparatus according to the present embodiment can be realized by the same structure as that of the reproduction apparatus shown in FIG. 3 except for the parameter determination section 605. Therefore, in FIG. 6, any component elements that are identical to those in FIG. 3 are denoted by the same reference numerals, and the descriptions thereof are omitted. The parameter determination section 605 receives a digital signal which has been demodulated by the digital demodulation section 304 and performs a decision process for the determination criterion parameter.

Next, the decision process for the determination criterion parameter which is performed by the parameter determination section 605 shown in FIG. 6 will be described. FIG. 7 is a flowchart illustrating the flow of the decision process for the determination criterion parameter in the parameter determination section 505 shown in FIG. 6. First, the parameter determination section 605 detects that the optical disk specialized for inspection purposes 600 has been newly set in the reading apparatus (step S701). As a result, reading of the physical features is begun for the newly-set optical disk specialized for inspection purposes 600. Next, the parameter determination section 605 reads the data in the feature forming area 11 of the optical disk specialized for inspection purposes 600 which has been set (step S702). Furthermore, the parameter determination section 605 compares the data which was read in the process of step 702 against the previously-read data which is stored in the storage section 306 (step S703). At step S703, when data is read for the first time, i.e., when no previously-read data is stored in the storage section 306, the parameter determination section 605 does not perform comparison.

After step S703, the parameter determination section 605 determines whether the data which was read in the process of step 702 differs from the previously-read data which is stored in the storage section 306 or not (step S704). If the result of the determination at step S704 indicates that the data which was read in the process of step 702 differs from the previously-read data which is stored in the storage section 306, then the parameter determination section 605 counts the number of times the data differed (step S705). The number counted in the process of step S705 is stored in the storage section 306. On the other hand, if the data which was read in the process of step 702 is identical to the previously-read data which is stored in the storage section 306, then the parameter determination section 605 proceeds to the process of step S706, without performing the process of step S705.

Next, the parameter determination section 605 makes a determination as to whether the reading process for the feature forming area 11 has been performed a predetermined number of times (step S706). It is desirable that the predetermined number of times, which is previously determined, be the same number of times as the number of times of reading performed in the optical disk reproduction apparatus shown in FIG. 3. If the result of the determination at step S706 indicates that the reading process for the feature forming area 11 has not been performed the predetermined number of times, then the parameter determination section 605 repeats the processes of step S702 to step S705. On the other hand, if the reading process for the feature forming area 11 has been performed the predetermined number of times, then the parameter determination section 605 calculates the probability of any data different from the previous one being read (step S707). The probability of any data different from the previous one being read is the probability of the data read in step S702 being identical to the data stored in the storage section 306 when the feature forming area 11 has been read the predetermined number of times.

After step S707, the parameter determination section 605 makes a determination as to whether the aforementioned probability has been calculated with respect to a predetermined number of optical disks for inspection purposes (step S708). The predetermined number, which is previously set in the production line, is the same as the number of optical disk specialized for inspection purposes. If the result of the determination at step S708 indicates that the probability has not been calculated with respect to the predetermined number of optical disks for inspection purposes, then the parameter determination section 605 causes the storage section 306 to store (step S709) the probability which was calculated in step S707, and performs the process of step S701. On the other hand, if the probability has been calculated with respect to the predetermined number of optical disks for inspection purposes, then the parameter determination section 605 decides the determination criterion parameter (step S710) based on the probability which was calculated in step S707, thereby completing its process. The determination criterion parameter which was decided in step S710 is stored in the storage section 306. According to the present embodiment, the determination criterion parameter is decided in the following manner.

The parameter determination section 605 calculates an average probability value from the probability with respect to each optical disk specialized for inspection purposes that is stored in the storage section 306. Next, based on the calculated average value, the parameter determination section 605 decides the determination criterion parameter. In the present example, the determination criterion parameter is decided at a value which is slightly smaller than the average value. For example, if the average probability value is 85%, the determination criterion parameter would be 80%. The manner of deciding the determination criterion is not limited to the above. For example, if it is desired to increase the yield and improve the productivity, the determination criterion parameter may be 70%, thereby setting a low determination criterion. In the case where it is desired to surely prevent unauthorized copying, e.g., if the contents is directed to a popular game, the determination criterion parameter may be 95%, thereby setting a high determination criterion. Alternatively, for example, a method which makes a decision based on the precision with which physical features are formed on optical disks associated with unauthorized copying may be used. Specifically, it would be possible to employ a method such that the determination criterion is decided to be 90% when optical disks satisfying a criterion of about 80% have come to be produced through unauthorized copying.

A different determination criterion parameter may be employed for each optical disk from a different production line, or for each optical disk of different contents. In the case where a different determination criterion parameter is employed for each production line, optical disks which are produced in the same production line are to be used as the optical disks for inspection purposes.

Furthermore, a different determination criterion parameter may be employed for every single optical disk. In this case, the optical disk is initially produced with data being recorded in the feature forming area 11 and the data recording area 13, but without a determination criterion parameter being recorded. Next, physical features formed in the feature forming area 11 are detected, and a determination criterion parameter is decided based on the detected physical features. The determination criterion parameter thus decided is recorded individually in an area where information can be additionally stored after the optical disks are produced.

In the optical disk according to the present embodiment, the determination criterion parameter may be recorded in an encrypted form. In other words, the determination criterion parameter may be encrypted, when recorded by the optical disk recording apparatus, so as to be decipherable by a reproduction apparatus.

While the invention has been described in detail, the foregoing description is in all aspects illustrative and not restrictive. It is understood that numerous other modifications and variations can be devised without departing from the scope of the invention.

What is claimed is:

1. An optical disk for use with an optical disk reproduction apparatus that determines whether said optical disk was produced in an authorized manner, said optical disk comprising:

data sectors providing readable data content, at least one physical feature different from said data sectors, said physical feature being formed with a certain precision and being checked, when the optical disk is in use, by the optical disk reproduction apparatus for determining whether said optical disk has been produced in an authorized manner, and a criterion recording area having a determination criterion parameter recorded therein, said determination criterion parameter specifying a minimum precision for determining authenticity of said optical disk, such that the optical disk reproduction apparatus determines said optical disk to have been produced in an authorized manner if the precision of said physical feature as detected by the optical disk reproduction apparatus exceeds the minimum precision specified by said determination criterion parameter.

2. The optical disk according to claim 1, wherein the criterion recording area is writable, and the determination criterion parameter recorded in the criterion recording area is specified based on the physical feature.

3. The optical disk according to claim 1, wherein the optical disk includes a plurality different physical features, and the criterion recording area includes a plurality of determination criterion parameters recorded therein, the plurality of determination criterion parameters being associated with the corresponding plurality of physical features.

4. The optical disk of claim 1 wherein said data sectors are arranged in recording tracks on said optical disk, and said physical feature comprises an array of pits formed between said recording tracks.

5. The optical disk of claim 1 wherein said optical disk includes inner and outer peripheries and plural recording tracks disposed between said inner and outer peripheries, said data sectors being stored within said recording tracks, said physical feature being disposed on at least one of said inner and outer peripheries.

6. An optical disk reproduction apparatus for reproducing data recorded on an optical disk including data sectors providing readable data content, said optical disk reproduction apparatus comprising:

a feature detection section for detecting a physical feature distinct from said data sectors, said physical feature being used for determining authenticity of said optical disk, a criterion reading section for reading from the optical disk a determination criterion parameter specifying a minimum precision, and a determination section coupled to said feature detecting section and said criterion reading section, said determination section determining authenticity of said optical disk by: detecting a precision with which said physical feature is formed; and comparing the detected precision of said physical feature against the minimum precision specified by said determination criterion parameter, such that said optical disk reproduction apparatus determines said optical disk to have been produced in an authorized manner if the detected precision of said physical feature exceeds the minimum precision specified by said determination criterion parameter.

7. The optical disk reproduction apparatus according to claim 6, further comprising a reproduction section for reproducing said data content recorded on the optical disk data sectors only if the determination section determines the optical disk was produced in an authorized manner.

8. The optical disk reproduction apparatus according to claim 7, wherein the determination section performs a sequence of plural checks to determine whether the optical disk was produced in an authorized manner, and upon the determination section determining, in response to at least a first check that the optical disk was produced in an authorized manner, the reproduction section beginning reproduction of the data contents before the feature detection section completes said sequence of plural checks.

9. The optical disk reproduction apparatus of claim 6 wherein said physical feature is unencrypted.

10. An optical disk recording apparatus for recording data on an optical disk of the type having data sectors providing data content to be read by an optical disk reproduction apparatus, said optical disk recording apparatus comprising:

a data recording section for forming the data sectors on the optical disk;

a feature formation section for forming at least one physical feature different from said data sectors, said physical feature being formed with a certain precision and being checked, when the optical disk is in use, by the optical disk reproduction apparatus for determining whether said optical disk has been produced in an authorized manner, and a criterion recording section for recording onto the optical disk a determination criterion parameter specifying a minimum precision for determining authenticity of said optical disk, such that the optical disk reproduction apparatus determines said optical disk to have been produced in an authorized manner if the precision of said physical feature as detected by the optical disk reproduction apparatus exceeds the minimum precision specified by said determination criterion parameter.

11. The optical disk recording apparatus according to claim 10, further comprising a determination criterion section for specifying the determination criterion parameter based at least in part on the physical feature on the optical disk, and the criterion recording section records the specified determination criterion parameter in a subsequently-writable area of the optical disk.

12. The optical disk recording apparatus according to claim 10, wherein the optical disk is prefabricated with at least one said physical feature for inspection purposes, and the determination criterion section specifies the determination criterion parameter based at least in part on the physical feature formed on a prefabricated optical disk.

13. A method for determining whether an optical disk to be reproduced is authentic, the optical disk including data sectors providing readable data content, a feature detection step of detecting a physical feature distinct from said data sectors, said physical feature being used for determining authenticity of said optical disk, a criterion reading step of reading from the optical disk a determination criterion parameter specifying a minimum precision, and a determination step of determining authenticity of said optical disk by: detecting a precision with which said physical feature is formed; and comparing the detected precision of said physical feature against the minimum precision specified by said determination criterion parameter, such that said optical disk is determined to have been produced in an authorized manner if the detected precision of said physical feature exceeds the minimum precision specified by said determination criterion parameter.

14. A method for producing an optical disk capable of being tested for authenticity by an optical disk reproduction apparatus, the optical disk being of the type having data sectors providing data content to be read by an optical disk reproduction apparatus, comprising:

a data recording step of forming the data sectors on the optical disk;

a feature formation step of forming at least one physical feature different from said data sectors, said physical feature being formed with a certain precision and being checked, when the optical disk is in use, by the optical disk reproduction apparatus for determining whether said optical disk has been produced in an authorized manner, a criterion recording step of recording onto the optical disk a determination criterion parameter specifying a minimum precision for determining authenticity of said optical disk, such that the optical disk reproduction apparatus determines said optical disk to have been produced in an authorized manner if the precision of said physical feature as detected by the optical disk reproduction apparatus exceeds the minimum precision specified by said determination criterion parameter.

15. The method for producing an optical disk according to claim 14, further comprising a criterion parameter deciding step deciding the determination criterion parameter based at least in part on the physical feature formed by the feature formation step, and the criterion recording step records the determination criterion parameter in a subsequently-writable area of the optical disk.

16. The method for producing an optical disk according to claim 14, wherein the optical disk is prefabricated with the physical feature thereon the method further comprising a criterion parameter deciding step of deciding the determination criterion parameter based at least in part on the physical feature form on the prefabricated optical disk.

* * * * *